UNITED STATES PATENT OFFICE.

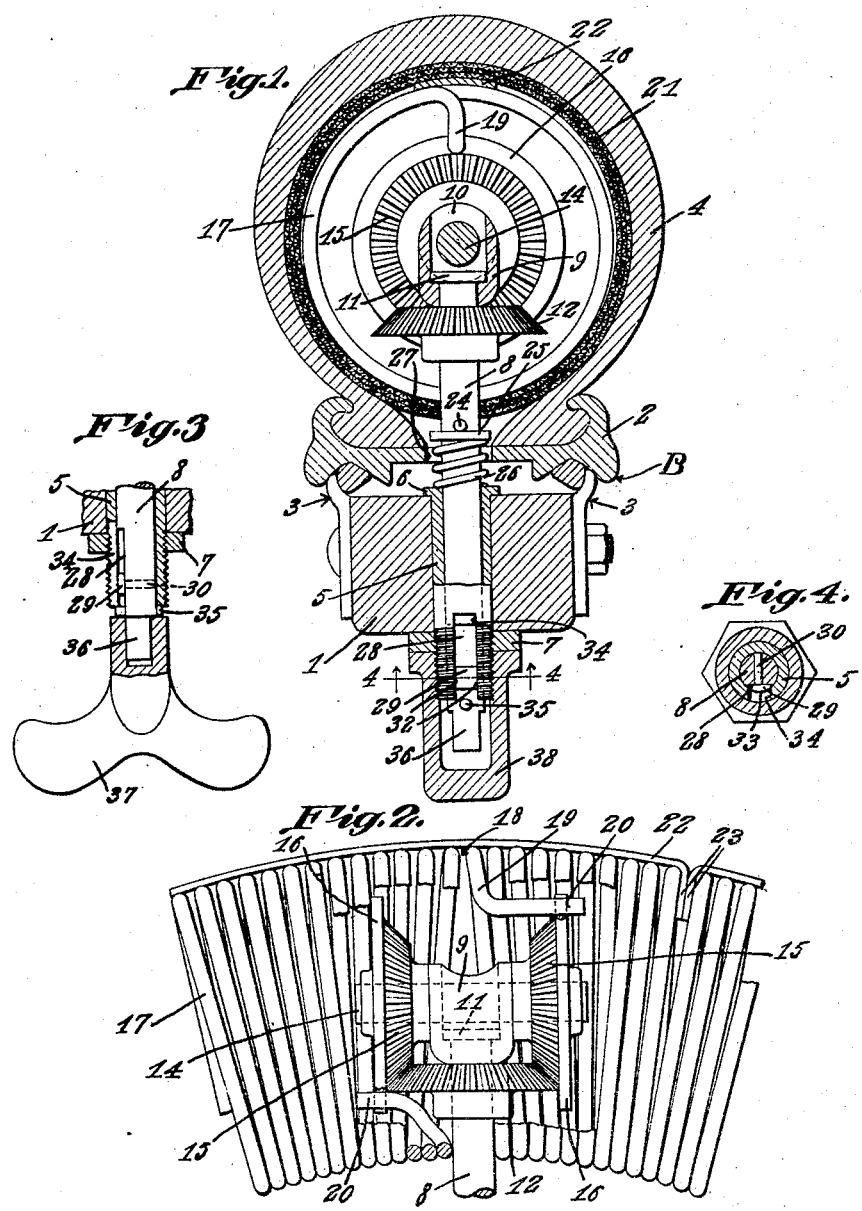

FRANK E. BESSLER, OF AKRON, OHIO.

INNER TUBE.

1,304,147. Specification of Letters Patent. Patented May 20, 1919.

Application filed September 17, 1918. Serial No. 254,485.

*To all whom it may concern:*

Be it known that I, FRANK E. BESSLER, a citizen of the United States, residing at Akron, in the county of Summit and State of Ohio, have invented a new and useful Inner Tube, of which the following is a specification.

The device forming the subject matter of this application is a tire, wherein the ordinary inflatable tube is replaced by a helical spring, and it is one object of this invention to provide novel means for controlling the spring, so that the spring may be expanded and contracted at the will of an operator.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in transverse section, a device constructed in accordance with the present invention;

Fig. 2 is a fragmental side elevation, wherein parts have been removed and broken away;

Fig. 3 is a sectional detail showing a key assembled with the main shaft; and

Fig. 4 is a cross section on the line 4—4 of Fig. 1.

The letter B marks a wheel body, including a felly 1 and a rim 2, the rim being assembled with the felly by any suitable means indicated at 3. The rim 2 carries a tire casing 4 which may be connected with the rim in various ways without jeopardizing the utility of the invention.

A sleeve 5 is mounted in the felly 1 and is provided at its outer end with a flange 6 engaging the outer curve of the felly. A nut 7 is threaded on the inner end of the sleeve 5 and engages the inner curve of the felly. A main shaft 8 is journaled for rotation and is mounted for endwise sliding movement in the sleeve 5. The outer end of the shaft 8 is journaled in a yoke 9 located within the casing 4 and provided with a recess 10, the shaft having a head 11 which coöperates with the base of the yoke 9, within the recess 10. A beveled pinion 12 is secured to the shaft 8 exteriorly of the yoke 9. It will now be clear, when Fig. 1 is examined, that, although the shaft 8 may rotate in the yoke 9, the shaft cannot move endwise with respect to the yoke.

An auxiliary shaft 14 extends circumferentially of the wheel body B and is journaled in the yoke 9, the shaft extending across the recess 10. Beveled pinions 15 are secured to the auxiliary shaft 14 on the outside of the yoke 9 and mesh into the beveled pinion 12 on the main shaft 8. The beveled pinions 15 are provided with laterally projecting flanges 16. A helical spring 17 extends entirely around the wheel body B with its casing 4. The ends of the helical spring are disposed closely adjacent to each other as shown at 18, opposite to the yoke 9. The ends of the helical spring 17 are provided with arms 19 which project toward the center of the casing 4, the arms terminating in fingers 20, disposed circumferentially of the body B, the fingers 20 passing through openings in the flanges 16 of the beveled pinions 15.

The spring 17 is inclosed within a tubular cover 21 which, if desired, may be divided longitudinally adjacent to the rim 2. A metal tread strip 22 is interposed between the cover 21 and the helical spring 17 and is provided with end projections 23 engaged between certain convolutions of the springs 17, as shown clearly in Fig. 2.

A pin 24 or the like extends through the shaft 8 near to the rim and 2 and a washer 25 surrounds the shaft and engages the pin. A compression spring 26 surrounds a portion of the main shaft 8, the outer end of the spring abutting against the washer 25, and the inner end of the spring abutting against the flange 6 on the sleeve 5. The rim 2 is provided with an opening 27 wherein the spring 26 and the washer 25 may work.

Adjacent its inner end, the shaft 8 is provided with a flat surface 28. The invention includes a latch head 29 bearing against the flat surface 28 of the shaft 8, and a stem 30 movably mounted in the shaft 8. The head of the latch has parallel side faces 32, and a curved end face 33 which corresponds in curvature to main shaft 8. A slot 34 is formed in the sleeve 5, and with this slot, the latch coöperates in a way to be pointed out hereinafter. A pin 35 passes through the shaft 8 and engages the end of the sleeve 5. The extremity 36 of the shaft 8 is shaped properly to coöperate with a key 37. A cap 38 is fitted on the end of the sleeve 5 and houses the extremity of the shaft 8, when the key 37 is removed.

In practical operation, when the cap is removed from the sleeve 5, the shaft 8 may be rotated by means of the key 37, and when the beveled pinion 12 is rotated, the beveled pinions 15 will be rotated, the helical spring 17 being expanded or contracted, so that the helical spring will take the place of an inflatable inner tube. When the latch is arranged as shown in Fig. 4, the shaft 8 may be rotated, but when the latch is so disposed that the parallel side faces 32 of the head 29 of the latch engage in the slot 34 of the sleeve 5, then the shaft 8 is locked against rotation. The latch may be manipulated by means of a pair of tweezers, or in any other suitable way.

When the casing 4 and the helical spring 17 yield, the shaft 8 can slide in the sleeve 5, the spring being compressed. When the shaft 8 slides outwardly, under the action of the spring 26, the pin 35, coöperating with the end of the sleeve 5, limits the outward movement of the shaft. The metal tread strip 22 protects the cover 21 from being worn by the action of the spring 17.

Having thus described the invention, what is claimed is:—

1. In a device of the class described, a wheel body; a casing on the body; a main shaft journaled in the body; a yoke wherein the shaft is journaled; an auxiliary shaft carried by the yoke; a beveled pinion on the main shaft; other beveled pinions mounted on the auxiliary shaft and meshing with the pinion on the main shaft; and a helical spring disposed within the casing and having its ends connected with said other beveled pinions.

2. In a device of the class described, a wheel body; a casing on the body; a sleeve mounted in the body; a main shaft journaled in the sleeve; a releasable latch connection between the main shaft and the sleeve; a helical spring within the casing; beveled pinions connected with the ends of the spring; means for supporting the beveled pinions for rotation; and a beveled pinion on the main shaft and meshing into the first specified beveled pinions.

3. In a device of the class described, a wheel body; a casing on the body; a main shaft mounted to slide endwise and to rotate in the body; an abutment on the shaft; a compression spring interposed between the abutment and the body; a helical spring in the casing; beveled pinions connected with the ends of the helical spring; means for supporting the beveled pinions rotatably; and a beveled pinion on the main shaft and meshing into the first specified beveled pinions.

4. In a device of the class described, a wheel body; a sleeve in the wheel body and provided at its outer end with a flange engaging the wheel body; a nut threaded on the inner end of the sleeve and coacting with the wheel body; a casing on the body; a helical spring in the casing; beveled pinions connected with the ends of the spring; a main shaft mounted to rotate and slide endwise in the sleeve; and a beveled pinion on the main shaft and meshing into the first specified beveled pinions.

5. In a device of the class described, a wheel body; a casing on the body; a helical spring in the casing; a tread strip disposed between the spring and the casing; beveled pinions connected with the spring; a shaft mounted to rotate and to slide endwise in the body; and a beveled pinion on the shaft, the beveled pinion meshing into the first specified beveled pinions.

In testimony that I claim the foregoing as my own, I have hereto affixed my signature in the presence of two witnesses.

FRANK E. BESSLER.

Witnesses:
 DOROTHY C. SABIAN,
 AMOS H. ENGLEBECK.

Copies of this patent may be obtained for five cents each, by addressing the "Commissioner of Patents, Washington, D. C."